Patented Dec. 20, 1938

2,140,609

UNITED STATES PATENT OFFICE 2,140,609

PRODUCTION OF SULPHONE-ETHYLAMINES

Hanns Ufer, Ludwigshafen-on-the-Rhine, Germany, assignor to I. G. Farbenindustrie Aktiengesellschaft, Frankfort-on-the-Main, Germany No Drawing. Application January 24, 1936, Serial No. 60,633. In Germany January 31, 1935

7 Claims. (Cl. 260—576)

The present invention relates to sulphoneethylamines and a process of producing same.

A process for the production of organic sulphur compounds is described in application Ser. No. 26,091, filed on June 11th, 1935 according to which compounds of the general formula

(in which X stands for —SO— or —SO₂—, R for an alkenyl group and R, for an organic radicle) are reacted with compounds containing at least one nitrogen atom combined with one or more hydrogen atoms.

I have now found that sulphone-ethylamines can also be obtained in very good yields by causing acetylene to act at elevated temperatures on mixtures of sulphinic acids and compounds which contain at least one nitrogen atom to which at least one hydrogen atom is directly attached.

The reaction may be carried out in the absence of catalysts, but is preferably carried out in the presence of catalysts. As such catalysts may be mentioned in particular basic substances, as for example the oxides, hydroxides, cyanides, alcoholates, phenolates and naphtholates of the alkali metals, and the oxides of zinc and cadmium. The salts of the said metals with organic acids, as for example their acetates, are also suitable as catalysts. There may also be added to the catalysts, mercury compounds, as for example mercuric oxide, sulphate or phosphate. Boron fluoride may also be present. The catalysts usually allow to employ somewhat lower temperatures. An acceleration in the absorption of acetylene is obtained also when substances having large surfaces, as for example active carbon, fuller's earth or silica gel, are added to the initial mixture.

The reaction may be carried out with monobasic or polybasic aliphatic or aromatic, sulphinic acids. The sulphinic acids may contain further atoms or atomic groups, as for example halogen atoms, acid radicles, or alkyl, hydroxyalkyl, alkoxy, nitro or substituted amino groups, provided the said acids are stable under the reaction conditions. As compounds containing at least one nitrogen atom to which at least one reactive hydrogen atom is directly attached, may be mentioned for example ammonia, primary and secondary alkylamines and hydroxyalkylamines (ethylamine, propylamine, butylamine, octodecylamine, octodecenylamine and mono- and dihydroxyethylamines), primary and secondary aromatic amines (aniline, phenylene diamine, naphthylamine and aminoanthraquinone), monoamines or polyamines of other isocyclic and heterocyclic compounds, aralkylamines (phenylethylamine) and cycloaliphatic amines (cyclohexylamine) and their mono-N-alkyl, hydroxyalkyl, aryl, aralkyl and acyl compounds. Furthermore compounds having at least one NH-group combined in the form of a ring, as for example piperidine or carbazole, may be employed. The said compounds may also contain halogen atoms, tertiary combined nitrogen atoms or alkyl, hydroxyalkyl, nitro, hydroxyl or carboxylic acid groups. Nitrogen compounds containing oxygen or an acyl group directly attached to the nitrogen atom bearing at least one reactive hydrogen atom are not to be employed.

The reaction temperature generally speaking lies between about 50° and about 250°, usually between 100° and 180° C. By reason of the fact that the sulphinic acids are usually not volatile without decomposition, the reaction is preferably carried out in the liquid phase. Solvents or diluents, such as alcohols, ketones, ethers or hydrocarbons, may also be advantageously employed.

When the boiling point of the components permits, the process may be carried out at atmospheric pressure, but in usually all cases it is preferable to work at increased pressure because the speed of reaction is thereby considerably increased. A sufficient dilution of the acetylene with inert gases such as nitrogen or ethane is then necessary.

The process may be carried out discontinuously or continuously. In the latter case it is preferable to use a pressure-tight tower, capable of being heated and, if desired, capable of being cooled, which is charged with the initial mixture heated to the reaction temperature, acetylene, for example, then being led upwards through the tower, if desired after dilution with inert gases. The unconverted acetylene is preferably returned to the tower. The sulphone-ethylamine formed is withdrawn continuously from the upper end of the tower while fresh initial mixture together with catalyst is continuously introduced at the bottom.

The sulphone-ethylamines obtained may be used for example for the preparation of dyestuffs, as assistants for the textile and related industries or, when appropriate initial materials are employed, as dyestuffs themselves.

The following examples will further illustrate the nature of this invention but the invention is not restricted to these examples. The parts are by weight.

Example 1

A gas mixture of nitrogen and acetylene in the ratio of 1:3 is pressed into a pressure-tight vessel provided with stirrers in which are 20 parts of para-toluene sulphinic acid, 13 parts of diethylamine, 50 parts of xylene, 0.5 part of anhydrous zinc oxide and 0.5 part of anhydrous cadmium oxide until the pressure is about 15 atmospheres. The vessel is then heated to from 130° to 135° C., the pressure thus being increased at first to about 25 atmospheres. The decrease in pressure occasioned by the reaction is equalized from time to time by the addition of high percentage acetylene. After about 15 hours, the calculated amount of acetylene has been absorbed and the whole is allowed to cool.

After distilling off the xylene under reduced pressure, there remain about 27 parts of a thick yellow oil which mainly consists of the compound:

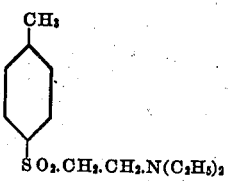

It may be precipitated in the form of its oxalic acid salt by dissolution in ethanol and addition of a solution of anhydrous oxalic acid in ethanol, and may then be purified by crystallization from ethanol. The oxalic acid salt forms colorless crystals which melt at about 160° C.

The same compound is obtained by employing as catalyst 1.5 parts of powdered potassium hydroxide instead of zinc oxide and cadmium oxide and by working at a somewhat higher temperature (about 160° C.). Instead of xylene, other solvents, as for example butanol, may be employed.

The same compound is also obtained without any catalyst, but the reaction in this case proceeds much more slowly, even at higher temperature (180° C.).

If, instead of diethylamine, 15.6 parts of monoethyl aniline be employed, there is obtained the sulphone-ethylamine of the formula:

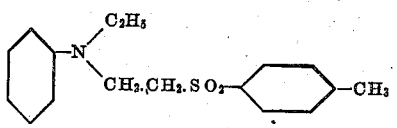

which forms colorless crystals melting at from 71° to 72° C. If, instead of para-toluene sulphinic acid, one employs benzene sulphinic acid, there is obtained the sulphone-ethylamine of the formula:

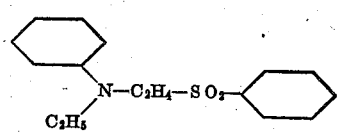

*Example 2*

A mixture of nitrogen and acetylene in the ratio of 1:2 is pressed in the manner described in Example 1 into a pressure-tight vessel containing 20 parts of para-toluene sulphinic acid, 12 parts of piperidine, 50 parts of xylene, 0.5 part of anhydrous zinc oxide and 0.5 part of anhydrous cadmium oxide until the pressure amounts to about 15 atmospheres. The vessel is then heated to from 130° to 140° C. The pressure is kept at between 18 and 25 atmospheres by the introduction of fresh high-percentage acetylene until the necessary amount of acetylene has been absorbed, which usually requires about 16 hours.

After distilling off the xylene under reduced pressure, the residue is extracted while hot with dilute aqueous hydrochloric acid and the hydrochloric acid solution is evaporated under reduced pressure. The hydrochloride of the new compound, which has the formula:

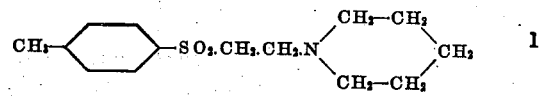

remains behind. It is obtained in the pure form by crystallization from ethanol. It forms colorless crystals which melt at 226° C.

If the piperidine be replaced by 3 parts of gaseous ammonia, the bis(beta-para-tolyl-sulphone-ethyl)amine having the formula:

$$(CH_3.C_6H_4.SO_2.CH_2.CH_2)_2.NH$$

is obtained, the hydrochloride of which forms colorless crystals which melt at from 200° to 201° C., and which may be well crystallized from water or ethanol.

Other sulphinic acids and other compounds containing at least one nitrogen atom combined with one or more hydrogen atoms yields the corresponding sulphone-ethylamines in a similar manner.

*Example 3*

Acetylene is caused to react in the manner described in the preceding examples with a mixture of 250 parts of para-toluene sulphinic acid ammonium salt, 300 parts of butanol, 5 parts of anhydrous ammonia and 8 parts of potassium hydroxide in a pressure-vessel provided with a stirrer. Any undissolved parts are separated off, the liquid is rendered acid to Congo and the solvent is distilled off. The residue consists of the hydrochloric acid salt of bis-($\beta$-para-tolyl-sulphonethyl)amine which may be purified by trituration with acetone and recrystallization from water or alcohol. The product consists of colorless crystals melting at from 200° to 201° C.

*Example 4*

300 parts of para-toluene sulphinic acid phenylhydrazine are mixed with 1500 parts of xylene and 1000 parts of the latter are distilled off whereby practically all the water present is removed. 10 parts of phenylhydrazine, 15 parts of potassium hydroxide, 5 parts of zinc oxide and 5 parts of cadmium oxide are added and the mixture obtained is treated at from 155° to 165° C. with acetylene in the manner described in Examples 1 and 2.

After cooling the undissolved parts are removed and the solution is freed from the solvent at about 100° C. under reduced pressure. The residual oil is dissolved in alcohol. By the addition of anhydrous oxalic acid the oxalic acid salt of the reaction product is precipitated in colorless crystals which after one recrystallization from ethanol melt at about 155° C. In contrast to oxalic acid phenylhydrazine salt it is readily soluble in hot alcohol.

*Example 5*

A mixture of 300 parts of 1.3-benzenedisulphinic acid diethylamine

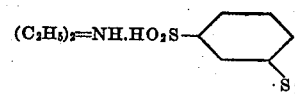

500 parts of xylene, 20 parts of diethylamine and 15 parts of potassium hydroxide is treated with acetylene at from 155° to 160° C. in the manner described in Examples 1 and 2. After cooling the undissolved parts are removed and the solution is freed from volatile parts by distillation under reduced pressure at about 100° C. The residue is an oil practically insoluble in water, soluble in warm ethanol and readily soluble in acetone. The product is dissolved in acetone and precipitated in the form of its oxalic acid salt by the addition of the adequate amount of anhydrous oxalic acid. The salt which according to analysis and its properties corresponds to the formula

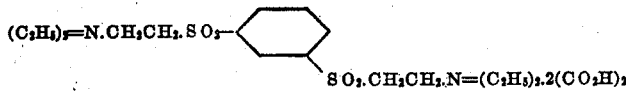

forms colorless crystals melting at from 143 to 145° C. and which are difficultly soluble in acetone, soluble in warm ethanol and readily soluble in water.

If instead of 1.3-benzenedisulphinic acid diethylamine the compound α.β-ethanedisulphinic acid diethylamine is employed, ethylene-bis(β-diethylaminoethyl-sulphone) is obtained in an analogous manner; it is an oil soluble in ethanol.

What I claim is:—

1. The process for producing sulphone-ethylamines, which comprises causing acetylene to act at a temperature between about 50° and about 250° C. on a mixture of a sulphinic acid selected from the group consisting of alkyl sulphinic acids and sulphinic acids of the benzene series and an amine selected from the group consisting of primary and secondary amines which are free from oxygen and acyl groups.

2. The process for producing sulphone-ethylamines, which comprises causing acetylene to act at a temperature between about 50° C. and about 250° C. in the presence of a basic reacting, metal compound on a mixture of a sulphinic acid selected from the group consisting of alkyl sulphinic acids and sulphinic acids of the benzene series and an amine selected from the group consisting of primary and secondary amines which are free from oxygen and acyl groups.

3. The process for producing sulphone-ethylamines, which comprises causing acetylene to act in the liquid phase at a temperature between about 50° C. and about 250° C. in the presence of a basic reacting, metal compound on a mixture of a sulphinic acid selected from the group consisting of alkyl sulphinic acids and sulphinic acids of the benzene series and an amine selected from the group consisting of primary and secondary amines which are free from oxygen and acyl groups.

4. The process for producing sulphone-ethylamines, which comprises causing acetylene to act in the liquid phase at a temperature between about 100° C. and 180° C. in the presence of a basic reacting, metal compound on a mixture of a sulphinic acid selected from the group consisting of alkyl sulphinic acids and sulphinic acids of the benzene series and an amine selected from the group consisting of primary and secondary amines which are free from oxygen and acyl groups.

5. The process for producing sulphone-ethylamines, which comprises causing acetylene to act in the liquid phase at a temperature between about 50° C. and about 250° C. in the presence of a basic reacting, metal compound and of a diluent on a mixture of a sulphinic acid selected from the group consisting of alkyl sulphinic acids and sulphinic acids of the benzene series and an amine selected from the group consisting of primary and secondary amines which are free from oxygen and acyl groups.

6. The process for producing sulphone-ethylamines, which comprises causing acetylene to act at a temperature between about 50° C. and about 250° C. on a mixture of a sulphinic acid of the benzene series and a secondary amine which is free from oxygen and acyl groups.

7. The compound corresponding to the formula:

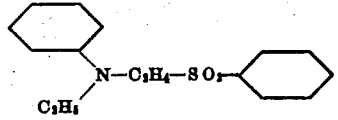

HANNS UFER.